United States Patent
Schmidt et al.

(10) Patent No.: US 11,519,544 B2
(45) Date of Patent: Dec. 6, 2022

(54) MEASURING TUBE, AND MEASURING TUBE FOR DETECTING AND/OR MONITORING AT LEAST ONE PROCESS VARIABLE OF A MEDIUM

(71) Applicant: Endress+Hauser SE+Co. KG, Maulburg (DE)

(72) Inventors: Robert Schmidt, Schopfheim (DE); Andreas Krumbholz, Maulburg (DE)

(73) Assignee: Endress+HauserSE+Co. KG, Maulburg (DE)

( * ) Notice: Subject to any disclaimer, the term of this patent is extended or adjusted under 35 U.S.C. 154(b) by 397 days.

(21) Appl. No.: 16/628,767

(22) PCT Filed: Jun. 19, 2018

(86) PCT No.: PCT/EP2018/066253
§ 371 (c)(1),
(2) Date: Jan. 6, 2020

(87) PCT Pub. No.: WO2019/007669
PCT Pub. Date: Jan. 10, 2019

(65) Prior Publication Data
US 2020/0124220 A1    Apr. 23, 2020

(30) Foreign Application Priority Data
Jul. 6, 2017    (DE) ..................... 10 2017 115 139.7

(51) Int. Cl.
*F16L 41/00*    (2006.01)
*G01D 11/30*    (2006.01)

(52) U.S. Cl.
CPC ............ *F16L 41/008* (2013.01); *G01D 11/30* (2013.01)

(58) Field of Classification Search
CPC .............................. F16L 41/008; G01D 11/30
(Continued)

(56) References Cited

U.S. PATENT DOCUMENTS 5,236,016 A * 8/1993 Vogelsang ........... H02G 3/0487
                                                          174/95
6,640,657 B1 * 11/2003 Smith .................... G01D 11/30
                                                          73/866.5
(Continued)

FOREIGN PATENT DOCUMENTS

CN         1780691 A      5/2006
CN       101346507 A      1/2009
(Continued)

*Primary Examiner* — Craig M Schneider
*Assistant Examiner* — David R Deal
(74) *Attorney, Agent, or Firm* — Kelly J. Smith; Endress+Hauser (USA) Holding Inc.

(57) ABSTRACT

The present disclosure relates to a measuring tube for conveying a liquid, comprising a tubular section and at least one tubular branch for accommodating at least one component of a measuring device. A first end region of the tubular branch is arranged at or in an opening in a wall along a longitudinal axis of the tubular section. According to the disclosure all points of at least a first portion of the wall, such as an inner surface of the wall, of the tubular section, which first portion defines the opening, are located in a plane. Furthermore, the present disclosure relates to an arrangement for determining or monitoring at least one process variable of a liquid in a pipeline, comprising a measuring device and a measuring tube of the disclosure.

13 Claims, 5 Drawing Sheets

(58) Field of Classification Search
USPC .......................................................... 138/108
See application file for complete search history.

(56) References Cited

U.S. PATENT DOCUMENTS

| | | | | |
|---|---|---|---|---|
| 7,607,364 | B2* | 10/2009 | Duff | ................ F16L 41/14 |
| | | | | 73/866.5 |
| 7,861,608 | B2* | 1/2011 | Furey | ............... G01D 11/245 |
| | | | | 73/866.5 |
| 8,043,681 | B2* | 10/2011 | Handing | ............ B62D 25/145 |
| | | | | 138/108 |
| 2008/0053255 | A1* | 3/2008 | Furey | ................. G01D 11/30 |
| | | | | 73/866.5 |
| 2010/0192700 | A1 | 8/2010 | Iijima | |
| 2011/0038394 | A1* | 2/2011 | Ma | ........................ G01K 13/02 |
| | | | | 703/2 |
| 2011/0243186 | A1* | 10/2011 | Brautigam | ............... G01K 1/14 |
| | | | | 374/E1.018 |
| 2012/0017698 | A1 | 1/2012 | Neuburger et al. | |
| 2013/0145861 | A1 | 6/2013 | Neven | |
| 2014/0000747 | A1* | 1/2014 | Lasarov | ................ B05D 7/22 |
| | | | | 156/247 |
| 2018/0216771 | A1* | 8/2018 | Kallweit | ............. G01D 11/245 |
| 2021/0286162 | A1* | 9/2021 | Huffman | ................ G02B 7/007 |

FOREIGN PATENT DOCUMENTS

| | | |
|---|---|---|
| CN | 101788312 A | 7/2010 |
| DE | 102010037994 A1 | 4/2011 |
| DE | 102011004807 A1 | 8/2012 |
| DE | 102013100158 A1 | 7/2014 |
| DE | 102013102055 A1 | 9/2014 |
| DE | 102013104781 A1 | 11/2014 |
| DE | 102013015038 A1 | 3/2015 |
| DE | 102013216948 A1 | 3/2015 |
| DE | 102015112424 A1 | 2/2017 |
| EP | 0440867 A1 | 8/1991 |

* cited by examiner

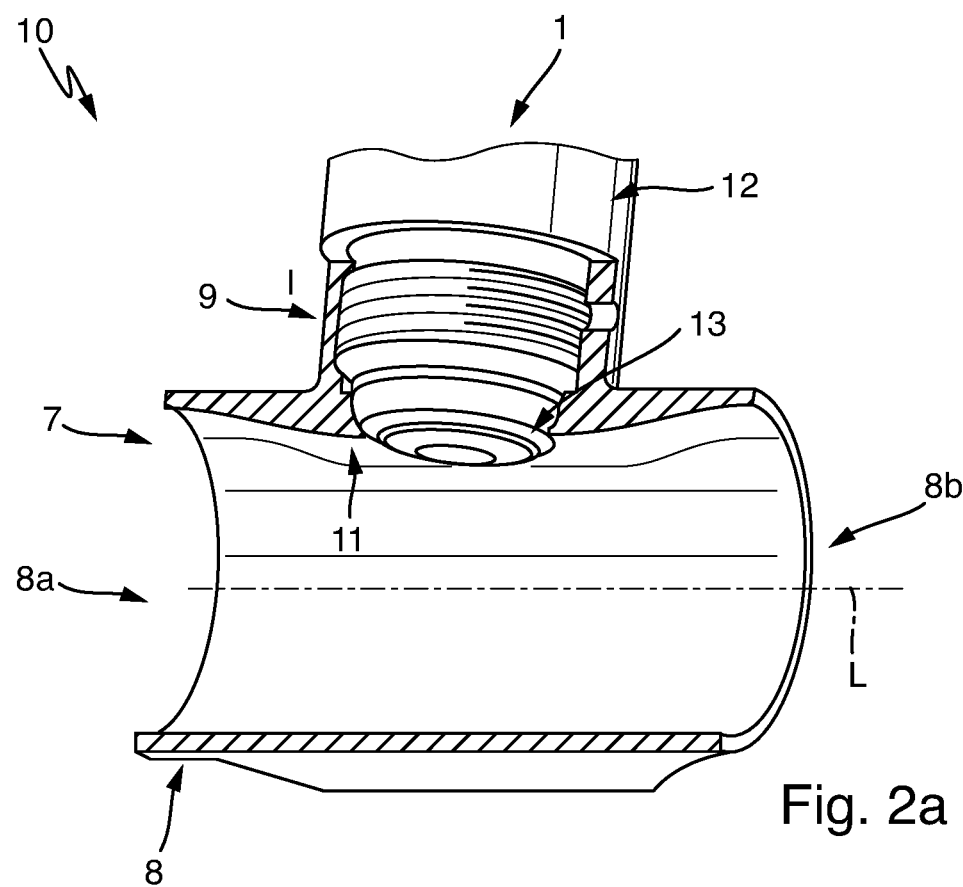
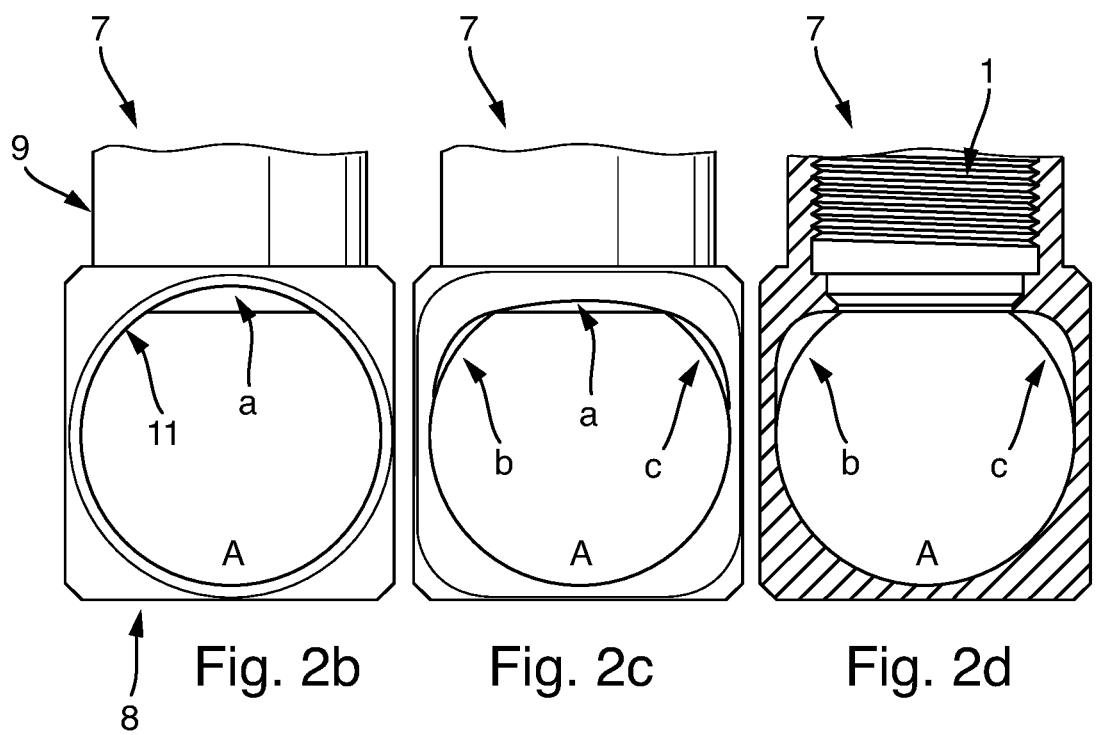
Fig. 2a
Fig. 2b  Fig. 2c  Fig. 2d

MEASURING TUBE, AND MEASURING TUBE FOR DETECTING AND/OR MONITORING AT LEAST ONE PROCESS VARIABLE OF A MEDIUM

CROSS-REFERENCE TO RELATED APPLICATIONS

The present application is related to and claims the priority benefit of German Patent Application No. 10 2017 115 139.7, filed on Jul. 6, 2017 and International Patent Application No. PCT/EP2018/066253, filed on Jun. 19, 2018, the entire contents of which are incorporated herein by reference.

TECHNICAL FIELD

The invention relates to a measuring tube for conveying a liquid as well as to a modular arrangement for determining and/or monitoring at least one process variable with a sensor and a measuring tube of the invention. The sensor is, in such case, especially introducible into the measuring tube, which, in turn, can be integrated into an existing pipeline system.

BACKGROUND

Measuring arrangements with a sensor and a measuring tube are used in automation technology in connection with a large number of measuring devices and/or field devices for determining various process variables, and are produced in great multiplicity and sold by the applicant. The process variable is, for example, the flow or the fill level of a flowing fluid, or also the pressure, density, viscosity, conductivity, temperature or pH-value of a fluid. However, also optical sensors, such as turbidity- or absorption sensors, are known and fall within the scope of the present invention.

The sensors are in many cases integrated in a measuring tube by means of suitable sealing mechanisms by form- and/or force interlocking, e.g. frictional interlocking, or also directly welded and/or adhered with the measuring tube. The measuring tube is, in turn, integrated into, for example, an existing pipeline system using suitable means known to those skilled in the art.

By introducing a sensor into the measuring tube, gaps, joints and/or dead spaces can disadvantageously arise. For a large number of applications, such as in the case of sterile processes, in which a product is made from a raw or starting material by the application of chemical, physical or biological procedures, for example, in the pharmacy, food- and/or drinks industries, such gaps, joints and/or dead spaces between individual components are not, or only in very limited measure, acceptable. Such areas of connection namely represent potential hiding places for health endangering germs. In order, for example, to avoid deposits, or the forming of a biofilm, within a pipeline, an as residue free as possible cleaning should be assured.

In this regard, various international or national regulatory authorities have created standards, among others for the manufacture and embodiment of equipment allowed for sterile processes, in which a product is made from a raw or starting material by the application of chemical, physical or biological procedures. By way of example, there can be mentioned here standards of the "American Society of Mechanical Engineers" (ASME), especially the so-called "ASME Bioprocessing Equipment" standard (BPE), or standards of the "3-A Sanitary Standards, Inc." (3-A), or also of the "European Hygienic Design Group" (EHEDG). The standards of ASME, BPE and 3A are, in such case, especially relevant for the Americas, while the standards of EHEDG come into play predominantly in Europe. Typical requirements formulated in these standards for a component concern especially the geometry and/or surface of a component, which must be formed in such a manner that no deposits can form, and the component must be simple to clean and/or sterilize. The standard of EHEDG, for example, prohibits narrow gaps.

With reference to measuring devices conforming to these standards, for example, DE102013100158A1 is noted, which describes a one piece device having a sensor and a tubular section with T-shape. The sensor is so arranged in a portion of the adapter that the end face of the sensor toward the liquid lies flush with the inner surface of the first portion of the adapter. The end face of the sensor is thus virtually an integral part of the inner surface of the first portion of the adapter. This construction, which is, with reference to the manufacturing, comparatively complex, prevents gap formation in the connection regions.

Known from German patent application No. 102016121643.7 unpublished at the date of first filing of this application is, furthermore, a measuring arrangement with a sensor, which is introducible releasably into an opening of a tubular section. For preventing gaps in the connection regions, at least one component of the sensor is so embodied that in the installed state it terminates flushly with an inner surface of the tubular section. The at least one component of the sensor is thus matched to a geometry of the tubular section. Also this variant involves a comparatively high effort for its construction.

SUMMARY

An object of the present invention is a measuring arrangement, which satisfies usual hygiene requirements in simple manner.

The object is achieved by the measuring tube as defined in claim 1 and by the modular arrangement as defined in claim 10.

Regarding the measuring tube, the object of the invention is achieved by a measuring tube for conveying a liquid. The measuring tube includes at least one tubular section and at least one tubular branch for accommodating at least one component of a measuring device. An end region of the tubular branch is arranged at or in an opening in a wall along a longitudinal axis of the tubular section. According to the invention, all points of at least a first portion of the wall, especially inner surface of the wall, of the tubular section, which first portion defines the opening, are located in a plane.

In general, the wall, especially the inner surface, of the tubular section is matched to its cross sectional area and at least partially curved. In many cases, the tubular section has, for example, a circularly round cross sectional area. At least in the region of the opening, thus in that portion of the wall, especially inner surface of the wall, which directly adjoins the opening, the wall is, however, essentially planar. In such case, on the one hand, an option is that essentially only that portion of the tubular section, which defines the opening, is planar. On the other hand, however, also a preferably rotationally symmetric, especially annular area around the, preferably rotationally symmetric, especially circular, opening can be involved. In each case, the planar portion includes that region, in which the opening is arranged. The embodiment of the invention of a measuring tube assures a gap- and/or dead space free transition between the wall, especially inner surface of the wall, of the tubular section and the component of the measuring device introducible into the tubular branch.

Advantageously, no additional modification of the component of a particular sensor introduced into the tubular branch is necessary for meeting the usual hygiene requirements. The component, especially the end face of the component, can be so arranged that such terminates essentially flushly with the wall of the tubular section in the region of the opening at or in which the tubular branch is arranged. Thus, the usual hygiene regulations can be met without special requirements for a component of the sensor. For example, a gap-free transition between the component and the wall of the tubular section can be assured.

The tubular section includes two other openings, for example, for introducing the measuring tube into an existing pipeline system. These two openings are in the case of a straight tubular section usually arranged along a shared longitudinal axis of the tubular section. The present invention is, however, not limited to such tubular sections. Rather, the tubular section can also have at least one curved segment.

Available for securing the tubular section in an existing pipeline system are generally all securement techniques known to those skilled in the art, such as, for example, flange- or welded connections.

The measuring tube of the invention can be manufactured both as one piece as well as also from a number of components joined together to form the component. This can vary depending on the particular manufacturing process. For example, the measuring tube can be constructed from one or more milled components. A number of components can also, for example, be welded together. However, also other suitable manufacturing methods known to those skilled in the art, for example, generative, or also additive, manufacturing methods provide options for manufacturing a measuring tube of the invention. In the case of a generative, or also additive, manufacturing method, such as, for example, a 3D printing method, a forming process is used, wherein a solid body with a geometrically defined form is formed from a formless material. Such generative manufacturing methods, which, in principle, represent an industrialized and mass production suitable, further development of so-called rapid prototyping, are becoming increasingly important in industrial manufacturing. The various manufacturing processes are well known to those skilled in the art and are therefore not explained here in detail.

In an embodiment of the measuring tube, a longitudinal axis of the tubular branch extends essentially at a predeterminable angle, especially perpendicularly, to the longitudinal axis of the tubular section. The two longitudinal axes are, thus at right angles to one another. Thus, the measuring tube is, for example, a measuring tube in the form of a T piece.

In an embodiment, the at least one component of the measuring device is a component of a sensor element. Especially, the component is a component, which in the ongoing operation of the measuring device is at least at times and/or partially process-contacting, for example contacting a liquid. In this regard, the tubular branch advantageously includes a securement unit, especially a screw thread, for securing the at least one component on or in the tubular branch. The securement unit is, in such case, preferably arranged in the end region of the tubular branch away from the tubular section.

In an especially preferred embodiment of the measuring tube, an area of a cross section of the tubular section along a longitudinal axis through the tubular section is essentially constant. The size of the cross sectional area thus remains essentially constant along the longitudinal axis. This is especially advantageous with reference to the flow profile of a liquid flowing through the measuring tube. In the case of steady flow, then location dependent changes of flow velocity along the longitudinal axis of the tubular section can be prevented.

In an additional, especially preferred embodiment, a shape of the cross sectional area of the tubular section along a longitudinal axis through the tubular section varies, especially continuously. In such case, the cross sectional area of the tubular section advantageously has, at least in one end region of the tubular section, essentially the same shape as that of a cross sectional area of an existing pipeline. In the at least one end region, the cross sectional area of the tubular section can then be embodied in the case of a pipeline system with circularly round cross sectional area, for example, likewise circularly. In the region of the opening, at or in which the tubular branch is arranged, a periphery of the cross sectional area has at least one planarly embodied segment.

An especially preferred embodiment of the measuring tube includes that a distance between an imaginary line in the region of the wall, especially the inner surface of the wall, of the tubular section in the region of the opening and the longitudinal axis through the tubular section in the region of the opening is less than or equal to a distance between an imaginary line in the region of the wall, especially the inner surface of wall, of the tubular section in at least one of the two end regions of the tubular section and the longitudinal axis through the tubular section in the region of the opening. The longitudinal axis extends at least in the region, in which the opening is located, in parallel with at least the wall in the first portion, thus in parallel with the plane, in which all points of the first portion lie. In this way, the formation of deposits or air bubbles can be prevented. Air bubbles collect, in such case, especially in the upper region of the measuring tube, while the accumulation of deposits in the lower region of the measuring tube is especially problematic.

Another embodiment of the measuring tube provides that the wall, especially inner surface of the wall, of the tubular section is planar in at least two additional portions in such a manner that each two of the portions are connected at least sectionally by a curved section of the wall, especially inner surface of the wall, of the tubular section. Preferably, the at least three portions have the same length in parallel with the longitudinal axis through the tubular section and have, in each case, equal distances to at least one of the two end regions of the tubular section.

The object of the invention is achieved, moreover, by an, especially modular, arrangement for determining and/or monitoring at least one process variable of a liquid in a pipeline, comprising a measuring device for determining and/or monitoring the at least one process variable with at least one sensor element and an electronics unit, and a measuring tube as described above, into which at least one component of the measuring device is introducible, especially releasably introducible.

The component, or at least a liquid facing end face of the component, introducible into the measuring tube is preferably in the ongoing operation of the measuring arrangement brought at least partially and/or at times in contact with the liquid. Since the component, or the end face of the component, terminates essentially flushly with the third opening of the tubular section, the contact region between sensor and liquid is advantageously limited to this face.

The flush arrangement assures, furthermore, an essentially residue free cleaning of the arrangement, which is relevant especially for applications involving sterile processes, in which a product is made from a raw or starting material by the application of chemical, physical or biological procedures.

The tubular branch as well as the at least one component are preferably embodied in such a manner that the component is introducible accurately fit into the tubular branch. In the case of a cylindrically embodied component, the tubular branch has preferably a circularly round cross sectional area, whose radius is matched to the dimensions of the cylindrically embodied component. In an embodiment, the tubular branch can also be at least one part of a housing of the component.

In an embodiment of the arrangement, the at least one component is embodied in such a manner that, when it is introduced into the tubular branch, it terminates essentially flushly with the wall of the tubular section in the first portion.

In an especially preferred embodiment, a transition between the tubular branch and the first portion of the wall of the tubular section is essentially gap free and/or dead space free.

Advantageously, no deposits or fouling can accumulate between the at least one component and the first portion of the wall of the tubular section. The arrangement of the invention is, thus, well suited for use, for example, in sterile processes, in which a product is made from a raw or starting material by the application of chemical, physical or biological procedures.

Another embodiment of the arrangement includes that the at least one component is introduced by means of a sealing element into the tubular branch. In such case, the sealing element is advantageously an O-ring.

An embodiment provides that the measuring device is a capacitive and/or conductive measuring device. The sensor element includes then at least a first electrode and at least a second electrode electrically insulated from the first electrode. The second electrode is generally also referred to as the guard electrode. This embodiment thus involves a flush mounting, capacitive and/or conductive sensor, which preferably is applied for detecting a predeterminable fill level, or the conductivity of the liquid. Such sensors, also referred to as multi sensors, are described, for example, in DE102011004807A1, DE102013102055A1, or also DE102013104781A1, to which comprehensive reference is taken. A corresponding sensor is further produced and sold by the applicant under the designation, FTW33.

The at least one component of the measuring device is preferably an electrode portion with an, especially circularly shaped, end face, wherein at least one electrode of the electrode portion terminates essentially with the end face. The end face can be planar and/or curved and, in turn, preferably terminates in the state installed in the tubular branch essentially flushly with the wall of the tubular section in the first portion.

The forms of embodiment of the measuring tube of the invention are applicable mutatis mutandis also for the arrangement of the invention and vice versa.

BRIEF DESCRIPTION OF THE DRAWINGS

FIGS. 2a, 2b, 2c, and 2d show a first embodiment of the measuring tube of the invention in different views (a-d), wherein a portion of the wall of the tubular section is planar.

DETAILED DESCRIPTION

The present invention is applicable to a large number of different sensors 1. Without limiting generality, the following description, however, concerns, for purposes of simplicity, the case of a flush mounting capacitive and/or conductive sensor 1 of the type shown schematically in FIG. 1. Furthermore, the present invention is applicable for a large number of different embodiments, especially geometries, of measuring tube 7. Likewise without limitation, the following description concerns for purposes of simplicity, however, exclusively a T-shaped measuring tube 7. The ideas of the invention can be applied analogously to other measuring devices 1 and other embodiments of the measuring tube 7.

Figure 1:
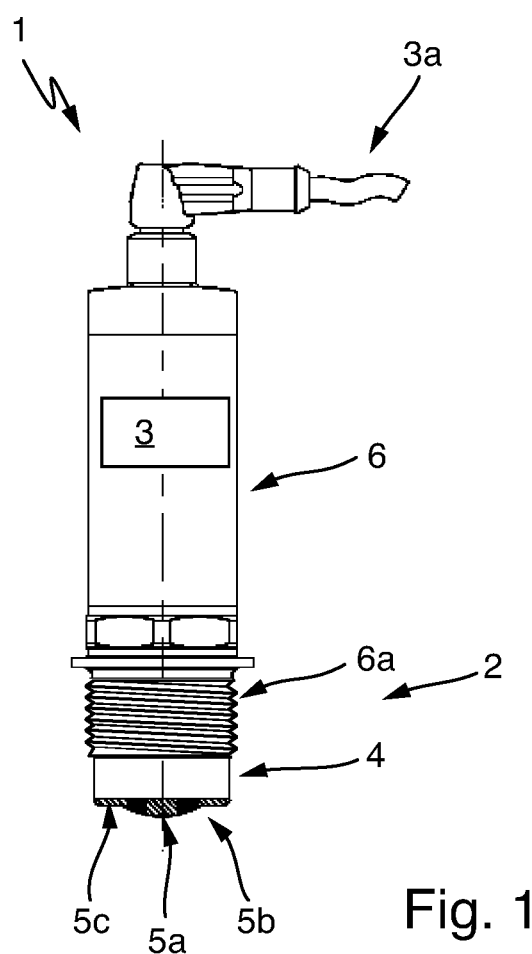
FIG. 1 shows a schematic representation of a flush mounting, capacitive and/or conductive sensor according to the state of the art.

The measuring methods underpinning a capacitive and/or conductive measuring device, especially a fill-level measuring device, are known per se in the state of the art. Corresponding field devices are produced and sold by the applicant, for example, under the mark, LIQUIPOINT. A schematic representation of a corresponding measuring device 1 is shown in FIG. 1. The sensor 1 includes a sensor unit 2, which, when the field device 1 is introduced into a container, terminates essentially flushly with the container, as well as an electronics unit 3, which is connectable releasably via a connection cable 3a, for example, with an external unit (not shown).

The sensor unit 2 is essentially coaxially constructed and includes an electrode portion 4, which in the illustrated example includes a measuring electrode 5a, a guard electrode 5b and a ground electrode 5c. Electrode assemblies 4 with less or more electrodes 5a-5c are also possible. Adjoining the electrode portion 4 is a housing 6, in which, among other things, the electronics unit 3 is arranged. Furthermore, process connection 6a serves for releasably securing the sensor 1 to a containment, for example, a container or a measuring tube 7, such as in FIGS. 2 to 4.

In the following, different embodiments for a measuring tube 7 of the invention are shown, by way of example. The individual explanations can be combined with one another as much as desired. Also, the present invention is not limited to the illustrated variants.

A first possible embodiment is subject matter of FIG. 2. FIG. 2a represents a perspective view of an arrangement 10 of the invention with a measuring device 1 as shown in FIG. 1 and a measuring tube 7 of the invention. The tubular section 8 of the measuring tube 7 includes a first opening 8a and a second opening 8b, by means of which the measuring tube 7 is integrateable, for example, into an existing pipeline system (not shown). Located in the region of a wall of the tubular section 8 is a third opening 8c, at which a tubular branch 9 is arranged. Tubular branch 9, or a longitudinal axis I of the tubular branch 9, is arranged at the third opening 8c, in such case, perpendicularly to the longitudinal axis L through the tubular section 8. Measuring tube 7 can be both a component manufactured as one piece as well as also a component formed by joining a number of components together.

All points in a first portion 11 of the wall of the tubular section 8, which first portion 11 defines the third opening 8c, lie according to the invention in a plane. In this regard, the first portion 11 can be formed in such a manner that it essentially includes only the points, which define the opening 8c. Alternatively, the portion can also comprise a, preferably annular, section of the wall of the tubular section 8 around the opening 8c.

The measuring device 1 is introduced into the tubular branch 9 in such a manner that the electrode portion 4 terminates essentially flushly with the wall of the tubular section 8 in the first portion 11. The measuring tube 7 of the invention enables correspondingly a gap- and/or dead space free arrangement, for example, for use in sterile processes, in which a product is made from a raw or starting material by the application of chemical, physical or biological procedures. Conventional hygiene regulations can thus be fulfilled in simple manner and without other modification of a particular measuring device.

Measuring device 1 is secured to the tubular branch 9 via the securement unit 12 [not visible]. The securement unit 12 is fitted for this purpose to the particular measuring device. Options include, for example, screw- or clamp connections. Furthermore, the arrangement in the illustrated example includes a sealing element 13 in the form of an O-ring. This is, however, not a necessary component of the present invention.

For the shown example, the measuring tube 7 is so embodied that an area of a cross section of the tubular section 7 along the longitudinal axis L is constant. This is best seen in FIGS. 2b-2d involving end or cross-sectional views of the measuring tube 7. In order that the wall of the tubular section 8 can be embodied to be planar in the first portion 11, the cross sectional area A of the tubular section is flattened in the region toward the tubular branch, as shown in FIG. 2b. The area segment 'a' lost from the originally circularly round cross sectional area A is added back to the cross sectional area A, as shown in FIG. 2c. To this end, the radius of curvature in the regions bordered on the planar portion 11 is selected in such a manner that added to the originally circularly round cross sectional area A are two additional segments b and c. The geometries of the segments a, b and c are, in such case, selected such that the area A of the cross section in each point along the longitudinal axis remains constant. Only the shape of the cross sectional area A varies for the shown example thus along the longitudinal axis L. A cross-sectional view of the measuring tube 7 with the planar portion 11 and a measuring device 1 integrated in the tubular branch 9 is, finally, shown in FIG. 2d. Due to the planar formation of the wall in the first portion 11, an essentially gap- and/or dead space free arrangement can be achieved, without that additional modification of the measuring device is needed.

The measuring tube 7 corresponding to the example of an embodiment of FIG. 2 is embodied, furthermore, in such a manner that the cross-sectional area A in the two end regions of the tubular section 7, thus in the regions of the first and second openings 8a,8b, are circular. Along the longitudinal axis L through the tubular section, in such case, the area of the cross section corresponds to the area of a cross section of an existing pipeline system, into which the measuring tube 7 is to be integrated.

Possible embodiments for preventing the formation of deposits and/or air bubbles within the measuring tube 7 are shown in FIG. 3. As evident from the longitudinal section in FIG. 3a, a distance d between an imaginary line $m_1$ in the region of the wall, especially the inner surface of the wall, of the tubular section 8 in the region of the opening and the longitudinal axis L through the tubular section 8 in the region of the opening is less than or equal to a distance D between an imaginary line $e_1$ in the region of the wall, especially the inner surface of the wall, of the tubular section 8 in at least one of the two end regions of the tubular section 8 and the longitudinal axis through the tubular section 8 in the region of the opening. Distance D corresponds, in such case, to the radius of an existing pipeline system [not shown].

Similar ideas hold also in the case of a larger number of additional planar portions. FIG. 3c represents in this way a longitudinal section of a measuring tube 7 with three additional planar portions 14, 15 and 16, of which only portion 15 lying opposite the first portion is visible. In this case, supplementally to the case in FIG. 3a, a distance d' between an imaginary line $m_2$ in the region of the wall, especially the inner surface of the wall, of the tubular section 8 in the region of the opening and the longitudinal axis L through the tubular section 8 in the region of the opening is less than or equal to a distance D' between an imaginary line $e_2$ in the region of the wall, especially the inner surface of the wall, of the tubular section 8 in at least one of the two end regions of the tubular section 8 and the longitudinal axis through the tubular section 8 in the region of the opening. Analogous ideas hold for other possible embodiments with three or more planar portions.

The two imaginary lines $m_1$ and $m_2$ are two lines along the inner surface of the tubular section 8 in the first portion 11 of the tubular section 8. The distance d, or d', is less than or equal to the distance D, or D'. As especially evident from FIG. 3b, the distance d, or d', can vary along the longitudinal axis L through the tubular section 8. In the two end regions of the tubular section 8, thus in the regions of the first and second openings 8a, 8b, the distance d corresponds essentially to the distance D, while at least in the region, in which the tubular branch 9 is arranged, it is less than the distance D.

The third opening 8c with the tubular branch 9 can basically be located at different positions. Preferably, however, the measuring tube 7 has an orientation, wherein the measuring device 1 is introduced horizontally into the tubular branch 9.

Figure 3A:
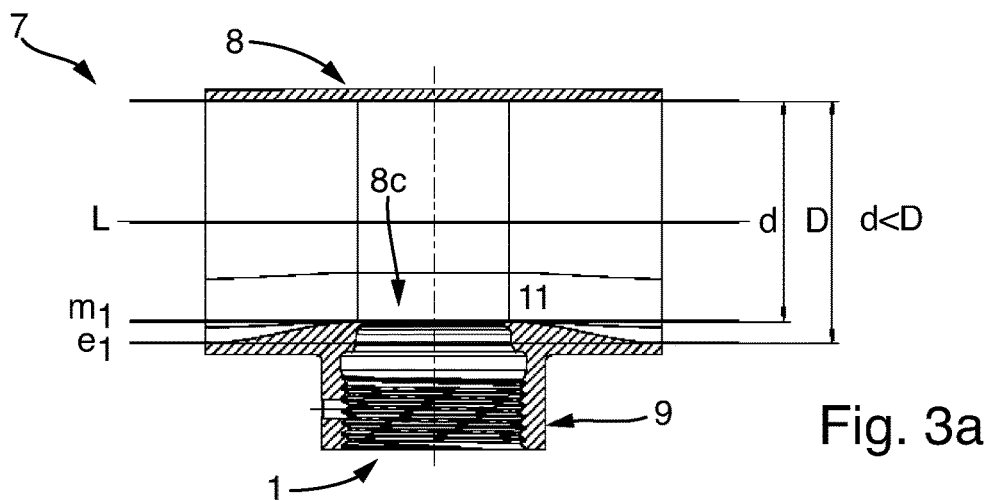
FIGS. 3a, 3b, 3c, 3d, 3e, 3f show other embodiments of the measuring tube of the present disclosure (a-d), and an illustration of the forming of air bubbles or deposits in an internal volume of the tubular section (e,f)
Figure 3B:
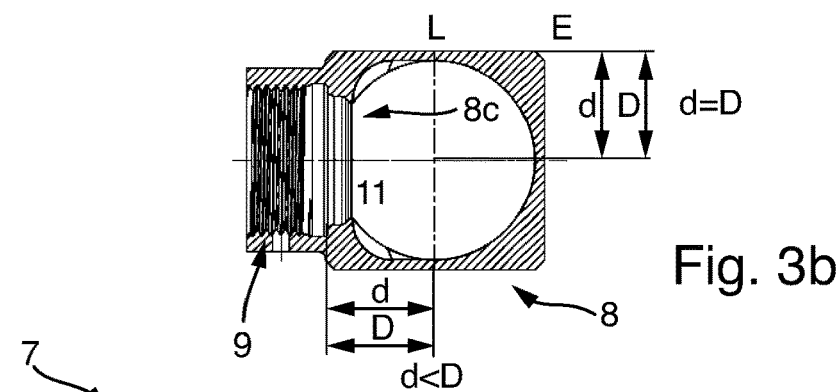
Figure 3C:
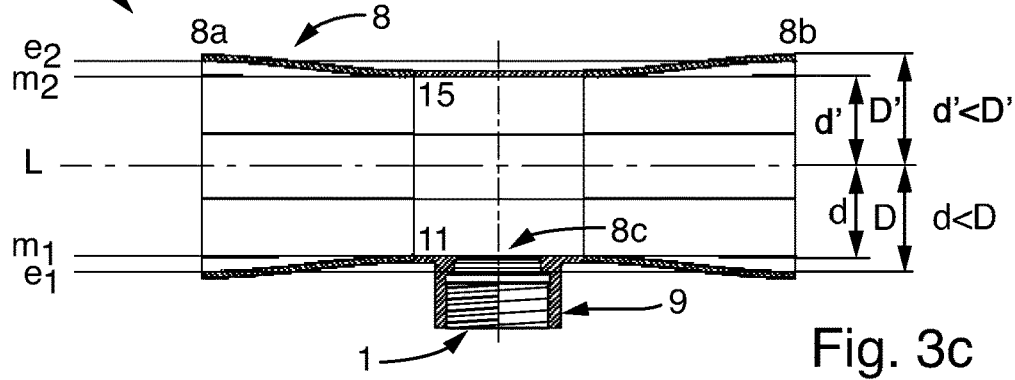
Figure 3D:
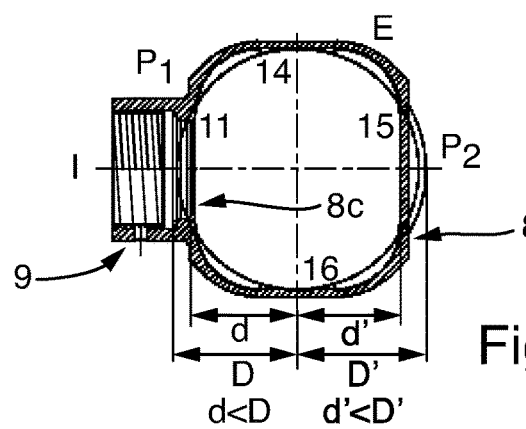

Views of the measuring tube 7 turned by 90° relative to FIGS. 3a and 3c are shown in FIGS. 3b and 3d. The distance d, or d', is at least in the region of the first portion 11 less than or equal to the distance D, or D'.

Figure 3E:
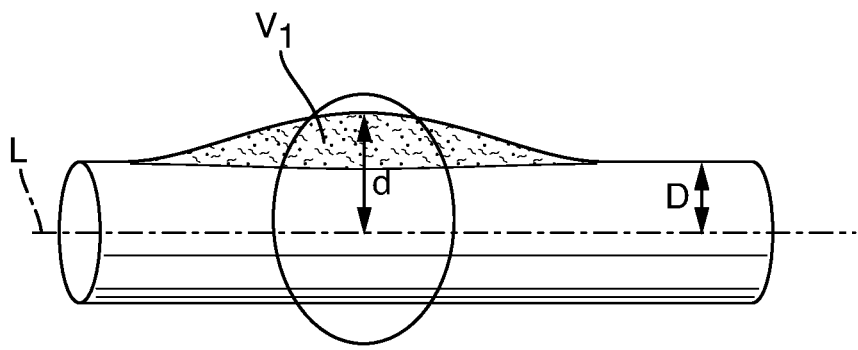
Figure 3F:
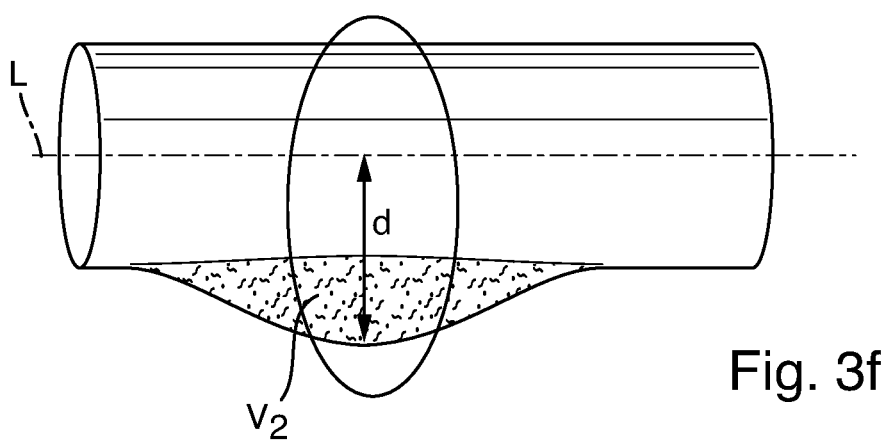

FIG. 3e illustrates a tubular section 8, wherein the distance d is greater than distance D in the region marked by the circle. In this example, air bubbles form in the region $v_1$ of the internal volume of the tubular section 8. Analogously, in the case of an embodiment as shown in FIG. 3f, deposits form in the region $v_2$ of the internal volume of the tubular section 8.

Figure 4:
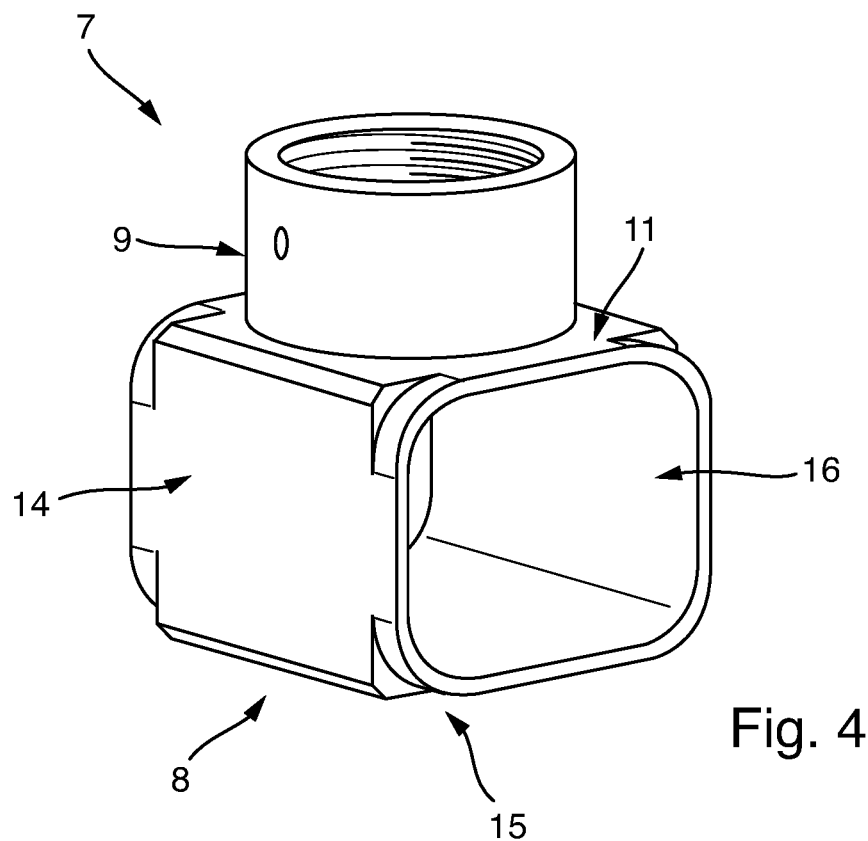
FIG. 4 shows an embodiment of the measuring tube of the present disclosure, wherein four portions of the wall of the tubular section are planar.

A perspective view of a measuring tube 7 is shown in FIG. 4 with besides the first portion 11 three additional planar portions 14,15,16. The tubular section 8 has sectionally a cross sectional area A in the form of a quadrilateral with rounded corners. For simplicity, only a section of the measuring tube 7 is shown in FIG. 4. The end regions of the tubular section 8 with, in each case, circularly round cross sectional areas are not shown. In the first planar portion 11, the third opening 8c is arranged with the tubular branch 9. The four portions 11,14,15 and 16 are preferably arranged in such a manner along a peripheral line of the cross sectional area A that a square with rounded corners results. The two planes defined by the planar surfaces in the four portions 11,14,15 and 16 are, thus, arranged in parallel with one another. The four portions 11,14,15 and 16 have, furthermore, the same length in parallel with the longitudinal axis L through the tubular section 8 and are, in each case, arranged at the same distance from the two end regions (not shown) of the tubular section 8.

Figure 5:
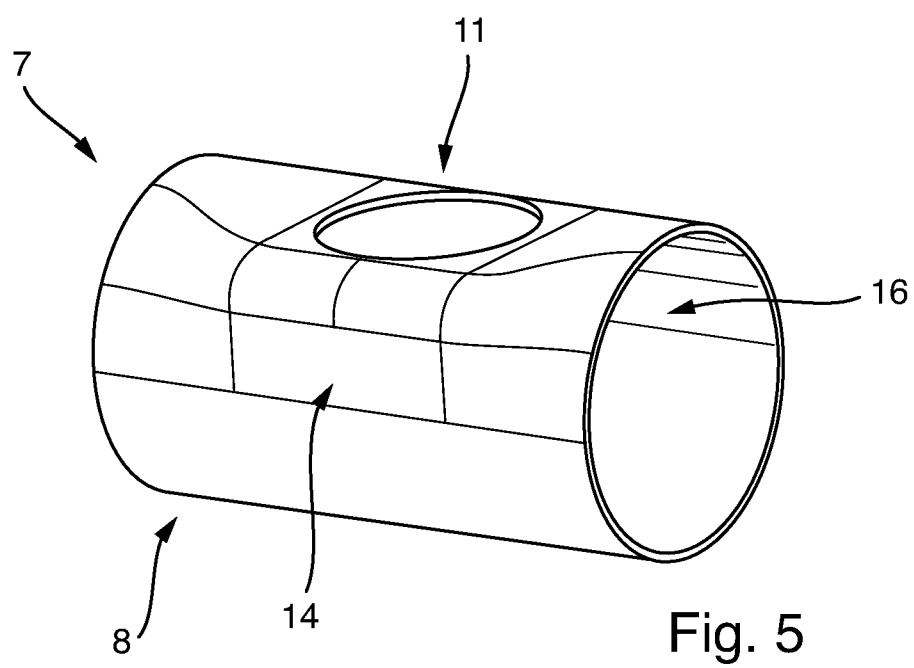
FIG. 5 shows an embodiment of the measuring tube of the present disclosure, wherein three portions of the wall of the tubular section are planar.

Another embodiment of the measuring tube 7 of the invention with besides the first portion two additional planar portions 11,14,16 is, finally, shown in FIG. 5. In contrast with FIG. 4, a portion lying opposite the third opening 8c is not planar. However, the invention is not limited to embodiments with one, three or four planar portions. Rather, numerous other embodiments with different numbers and different arrangements of various planar portions provide other options and fall within the scope of the present invention.

The measuring tube 7 of the invention advantageously permits the implementing of a hygienic measuring point satisfying established regulations. Especially in the case of tube systems with comparatively small tube diameters, e.g. DN32, this solution is advantageous, since the particular sensor 1 does not need to be modified for fulfillment of the pertinent hygiene requirements. An essentially flush and especially gap- and/or dead space free arrangement 10 can be achieved by targeted adapting of the measuring tube 7.

LIST OF REFERENCE CHARACTERS 1 capacitive/conductive sensor
2 sensor unit
3 electronics unit
4 electrode portion
5a-5c electrodes
6 housing
6a process connection
7 measuring tube
tubular section
8a-8c first, second, third openings
9 tubular branch
10 arrangement of the invention
11 first portion
12 securement unit
13 sealing element
14 second portion
15 third portion
16 fourth portion
L longitudinal axis through the tubular section
l longitudinal axis through the tubular branch
A cross sectional area of the tubular section
a,b,c segments of the cross sectional area A
$m_1,m_2$ imaginary lines along the wall of the tubular section in the region of the opening
$e_1,e_2$ imaginary lines along the wall of the tubular section in end regions
$P_1,P_2$ points along the lines $m_1,m_2$
D diameter of an existing pipeline system
d distance between $m_1,m_2$
$v_1,v_2$ regions of the internal volume of the tubular section

The invention claimed is:

1. A measuring tube for conveying a liquid, comprising:
a tubular section and at least one tubular branch for accommodating at least one component of a measuring device,
wherein a first end region of the tubular branch is arranged at or in an opening in a wall along a longitudinal axis of the tubular section,
wherein all points of at least a first portion of the wall defining the opening are located in a plane,
wherein an area of a cross section of the tubular section is constant along a longitudinal axis through the tubular section,
wherein a shape of the cross sectional area of the tubular section varies along a longitudinal axis through the tubular section.

2. The measuring tube of claim 1, wherein a longitudinal axis of the tubular branch extends at a predeterminable angle to the longitudinal axis of the tubular section.

3. The measuring tube of claim 1, wherein the at least one component of the measuring device is a component of a sensor element.

4. The measuring tube of claim 1, wherein the tubular branch includes a securement unit for securing the at least one component on or in the tubular Branch.

5. The measuring tube of claim 1, wherein the cross sectional area of the tubular section has, in an end region of the tubular section, the same shape as that of a cross sectional area of an existing pipeline.

6. The measuring tube of claim 1, wherein a distance between an imaginary line in the region of the wall of the tubular section in the region of the opening and the longitudinal axis through the Tubular section in the region of the opening is less than or equal to a distance between the imaginary line in the region of the wall of the tubular section in at least one of the two end regions of the tubular section and the longitudinal axis through the tubular section in the region of the opening.

7. A measuring tube for conveying liquid, comprising:
a tubular section and at least one tubular branch for accommodating at least one component of a measuring device,
wherein a first end region of the tubular branch is arranged at or in an opening in a wall along a longitudinal axis of the tubular section,
wherein all points of at least a first portion of the wall defining the opening are located in a plane,
wherein the wall of the tubular section is planar in at least two additional portions in such a manner that each two of the portions are connected at least sectionally by a curved section of the wall of the tubular section.

8. An arrangement for determining or monitoring at least one process variable of a liquid in a pipeline, comprising:
a measuring device for determining or monitoring the at least one process variable with at least one sensor element and an electronics unit; and
a measuring tube including: a tubular section and at least one tubular branch for accommodating at least one component of the measuring device, wherein a first end region of the tubular branch is arranged at or in an opening in a wall along a longitudinal axis of the tubular section, wherein all points of at least a first portion of the wall defining the opening are located in a plane;
wherein the at least one component of the measuring device is introducible into the measuring tube, wherein an area of a cross section of the tubular section is constant along a longitudinal axis through the tubular section, wherein a shape of the cross sectional area of the tubular section varies along a longitudinal axis through the tubular section.

9. The arrangement of claim 8, wherein the at least one component terminates flushly with the wall of the tubular section in the first portion when the at least one component is introduced into the tubular branch.

10. The arrangement of claim 9, wherein a transition between the tubular branch and the first portion of the wall of the tubular section is gap free.

11. The arrangement of claim 8, wherein the at least one component is introduced using a sealing element into the tubular branch.

12. The arrangement of claim 11, wherein the sealing element is an O-ring.

13. The arrangement of claim 8, wherein the measuring device is a capacitive or conductive measuring device.

* * * * *